United States Patent [19]

Seemann

[11] Patent Number: 5,303,501
[45] Date of Patent: Apr. 19, 1994

[54] TRAINING AID FOR PEST CONTROL

[76] Inventor: Douglas L. Seemann, 11840 N. Gray Eagle Ave., Tucson, Ariz. 85737

[21] Appl. No.: 881,956

[22] Filed: May 12, 1992

Related U.S. Application Data

[63] Continuation of Ser. No. 7,485,671, Feb. 27, 1990, abandoned.

[51] Int. Cl.$^5$ .................. G09B 23/00; A01M 1/14
[52] U.S. Cl. ................................. 43/114; 434/276; 434/296; 434/370; 434/428
[58] Field of Search ................. 43/113, 107, 114, 121, 43/122, 61; 434/276, 295, 296, 368, 370, 428, 324

[56] References Cited

U.S. PATENT DOCUMENTS 3,913,259 10/1975 Nishimura et al. .

OTHER PUBLICATIONS

"Zone Monitor" advertising Sheets, No-Tax Corporation-2 sheets.

Primary Examiner—Paula A. Bradley
Assistant Examiner—Chuck Y. Mah
Attorney, Agent, or Firm—Robert A. Seemann

[57] ABSTRACT

A simulated insect trapping surface for removably supporting visual representations of insects. A plurality of icons symbolizing insects, for attaching to the simulated trapping surface, and an adhesive interface between each icon and the surface for temporarily holding the icons on the surface, for teaching interpretation of an insect pattern in a sticky monitoring trap. Instead of the adhesive interface, the simulated trapping surface supports visual representations of the insects by including liquid crystal, and is transparent to light for optical projection of the representations for viewing and interpretation.

1 Claim, 3 Drawing Sheets

    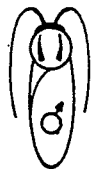
FIG. 9  FIG. 10  FIG. 11  FIG. 12  FIG. 13
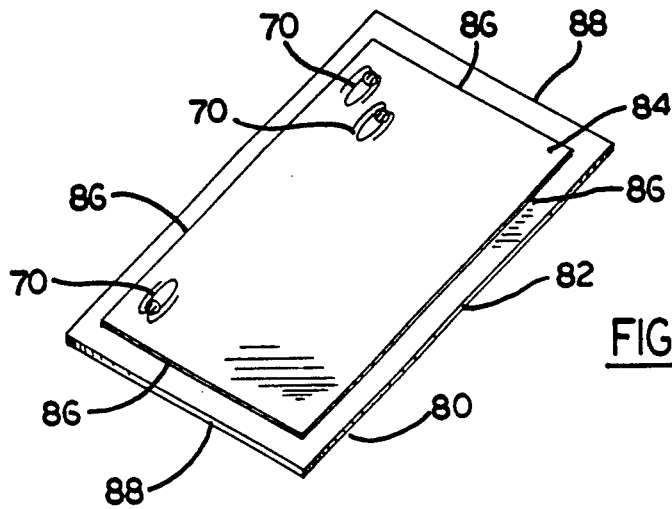
FIG. 14
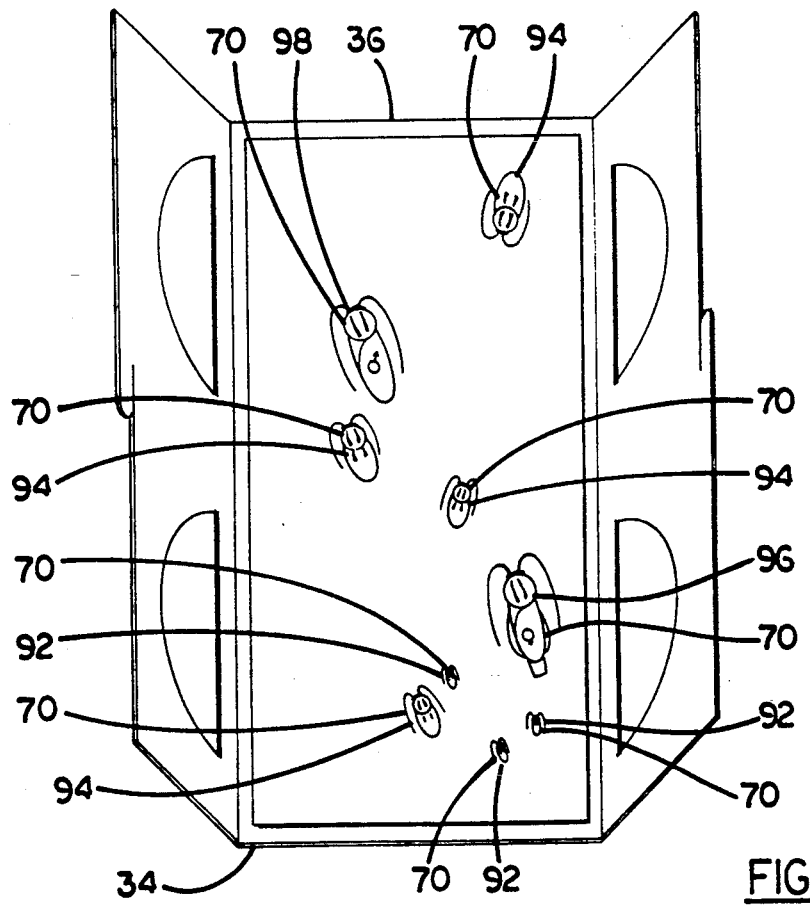
FIG. 15

TRAINING AID FOR PEST CONTROL

This is a continuation of application Ser. No. 07/485,671, filed Feb. 27, 1990, now abandoned.

BACKGROUND OF THE INVENTION

1. Field of the Invention

This invention relates in general to a training aid in the biological field of insect pest control, more specifically to an apparatus and method for demonstrating the interpretation of an insect pattern on a sticky monitoring trap, for determining the characteristics and location of an insect population.

A monitoring trap used in the pest control industry includes a sticky surface which stops and permanently holds insects that attempt to cross. The type, age and arrangement of insects trapped on the surface, in consideration of local temperature, humidity, and air currents, provide valuable clues for locating the nest and for applying safe, efficient control to the infestation by chemical or other means.

2. Description of the Prior Art

Sticky monitoring traps can come in various forms. All include at least one wall having a surface that is adapted for stopping and permanently retaining in place, insects that traverse the surface.

The present invention comprises a simulated monitoring trap which includes a wall with a simulated trapping surface on the wall, the surface being adapted for removably supporting visual patterns of insects in predetermined arrangements and patterns for instructing about interpretations of patterns found in monitoring traps.

A typical monitoring trap is later described with reference to FIGS. 1-4.

SUMMARY OF THE INVENTION

It is one object of the invention to provide a teaching aid which displays a representation of insects on the sticky surface of a monitoring trap for instructing in interpretation of the display.

It is another object of the invention to provide a teaching aid which changeably displays a representation of insects on the sticky surface of a monitoring trap for instructing.

It is another object to provide a teaching aid which changeably displays a representation of insects on the sticky surface of a monitoring trap, for simultaneous demonstration to a plurality of observers with a single aid.

Another object is to provide a teaching aid which changeably displays a representation of insect patterns normally found in a monitoring trap, with a predetermined pattern of icons symbolizing insects.

In accordance with the invention, the simulated monitoring trap includes a first wall with a simulated trapping surface that is adapted for removably supporting visual representations of insects. The simulated trap includes a plurality of icons symbolizing insects, for attaching to the simulated trapping surface, and means for temporarily holding the icons on the surface.

A second wall is hingedly attached to the first wall so that it may rotate between a first position over the simulated trapping surface for defining a representation of an opening for access by insects to the simulated trapping surface, and a second position away from the simulated trapping surface so that the insect representations on the surface can be revealed for viewing and interpretation.

The means for temporarily holding each icon on the simulated trapping surface includes an adhesive interface between the icon and the surface. It may however, include a magnet, cohesive, or interlocking interface such as Velcro (tm).

For versatile presentation of the supported representations of the insects by optical projection, the first wall has a characteristic of transparency to light.

Another means for temporarily holding the icons on the surface includes the visual representations of insects being by liquid crystal imaging, such as by computer driven liquid crystal display which may be incorporated on or made a part of the surface. Preferably the first wall includes the characteristic of transparency to light for optical projection.

BRIEF DESCRIPTION OF THE DRAWINGS

In order that the invention will be more fully comprehended, it will now be described, by way of example, with reference to the accompanying drawings, in which:

FIGS. 7 through 13 are schematic views for example of a variety of icons symbolizing insects for use in the present invention.

FIG. 14 is a perspective view of the invention with a temporary visual representation of insects on the simulated trapping surface for presentation by overhead projection.

FIG. 15 is a top view of the invention with a temporary visual representation of insects in a pattern, in place on the simulated trapping surface for demonstration of interpretation.

DESCRIPTION OF THE PREFERRED EMBODIMENTS

Figure 1:
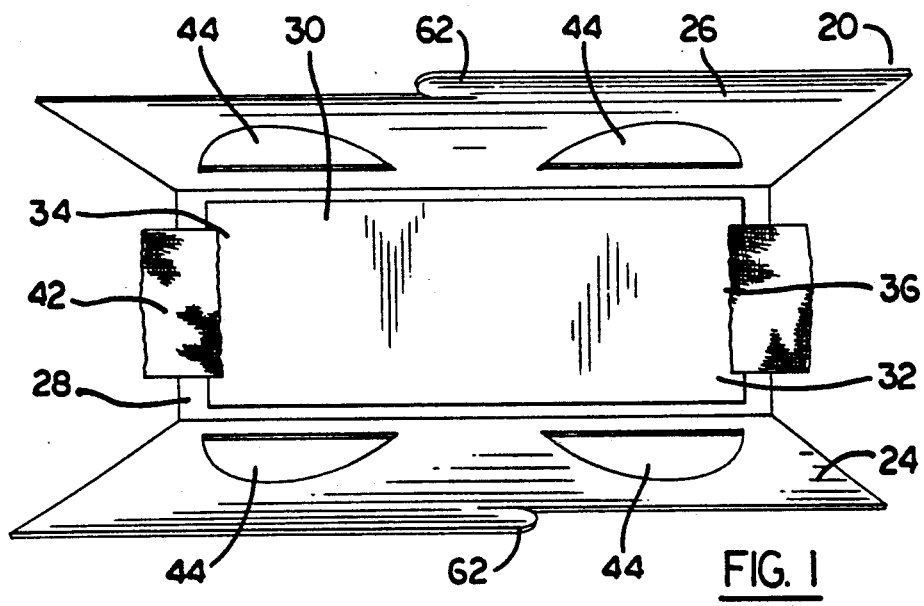
FIG. 1 is a top view of a typical monitoring trap.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

The present invention is used for teaching the interpretation of insect patterns which are formed as the insects are caught in a monitoring trap which stops and holds them on a sticky surface. Before describing the invention, therefore a brief description of a monitoring trap is in order.

Monitoring trap 20, FIG. 1 is shown with side walls 24 and 26 folded away from a position over insect trapping surface 30 of wall 28.

Trapping surface 30 includes an adhesive 32 which stops and permanently holds in place an insect that moves over the surface. There are a variety of adhesives used for this purpose, as the "sticky" trap has been used for more than 30 years to catch insects for control through attrition before it was considered for use to detect, monitor and analyze populations. U.S. Pat. No. 3,913,259, patented by Akira Nishimura et al, Oct. 21, 1975, for example describes one type of adhesive coating composition used for capturing cockroaches of various sizes. An odor that is attractive to the insects is often included in a trap.

Figure 2:
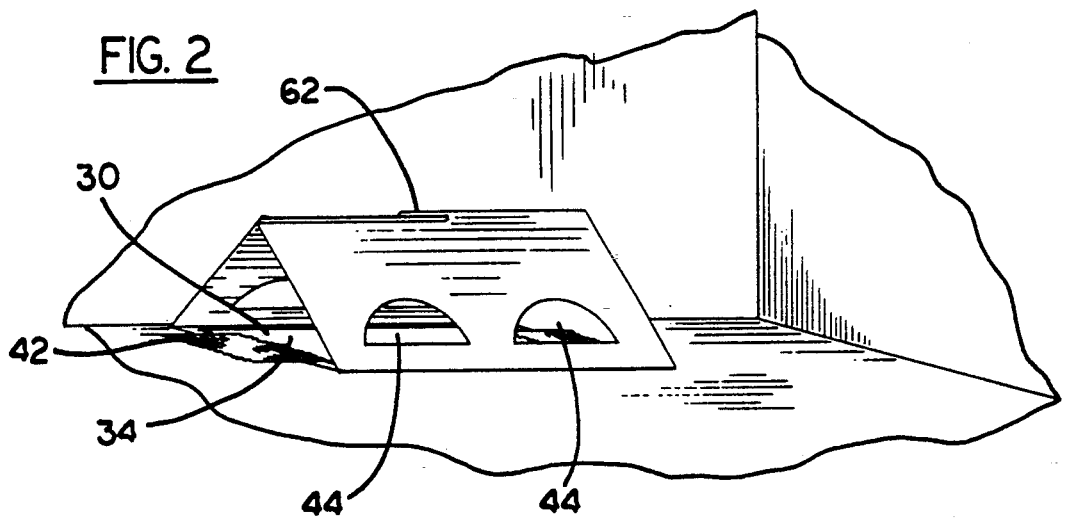
FIG. 2 is a perspective view of a typical monitoring trap in place for receiving insects.
Figure 3:
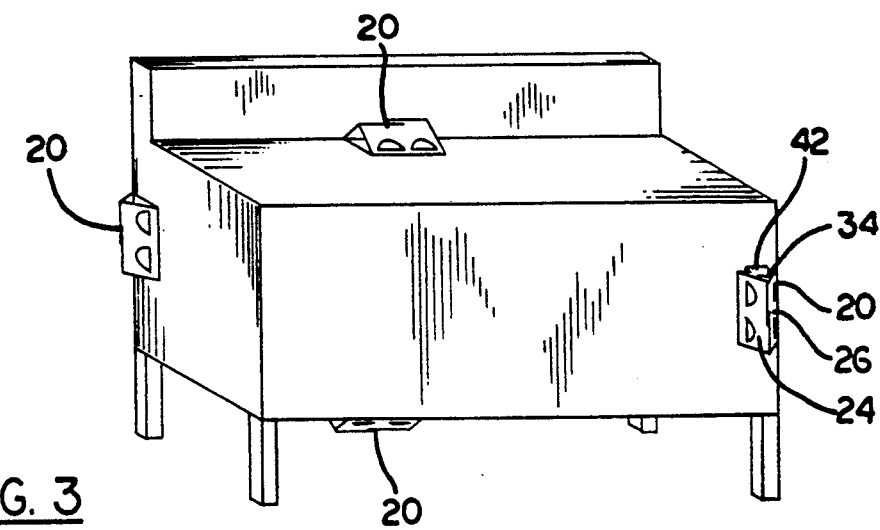
FIG. 3 is a perspective view of a series of monitoring traps in place for receiving insects.

Most cockroaches travel along a crevice or edge guided by a pair of antennae on the adjacent surfaces or edge. A trap used for monitoring an area for cockroaches is mounted in a room or on the surface of a thing adjacent to seams or edges as shown in FIGS. 2 and 3, with one edge of the trap parallel and tangent to or continuous with an adjoining surface to the edge or seam. The trap is located in an area of likely infestation such as at a sink, junction box, warm electrical equipment or behind a hung ceiling.

One sticky monitoring trap may be obtained under the name of "Zone Monitor" from No-Tox Corporation, P.O. Box 636, Riverdale, NY 10471.

To maintain the trap in position, it is often attached with tape 42 at a major opening 34, 36 of the trap. In some cases the back of the trap is coated with an adhesive material to maintain the trap in the desired position.

The major opening to insect trapping surface 30 is an unobstructed region that provides easiest access to the trapping surface by insects outside the trapping surface, based on their travel habits.

Figure 4:
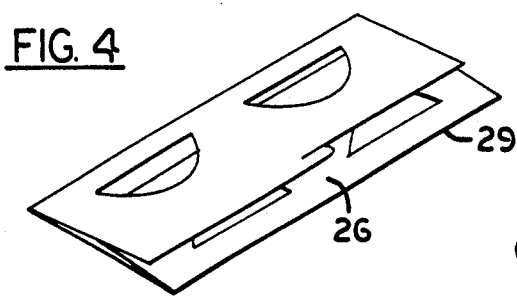
FIG. 4 is a perspective view of a typical monitoring trap, folded for storage before use.

Although not required for successful use of a monitoring trap, a side wall 24 is usually provided. During storage it is folded on hinge 29, to a position that is close to the adhesive surface as shown in FIG. 4, to extend storage life. When stored, the adhesive surface is often covered with a removable protective sheet.

When the trap is set, as shown in FIG. 2, the side wall is rotated to a shielding position over the adhesive surface to protect the adhesive from life shortening contamination, shield public view from trapped insects, create a shadow pattern attractive to dark seeking insects, and define major openings 34, 36 for access by the insect. It is fastened by interlock 62 to side wall 26.

A material emitting an attracting odor is usually included in the trap to draw the insects to the adhesive.

The side wall is often provided with minor openings 44 through which roaches may access the adhesive surface. Minor openings 44 are provided.

Training aids according to preferred embodiments of the invention will now be described with reference to FIGS. 5-7.

Figure 5:
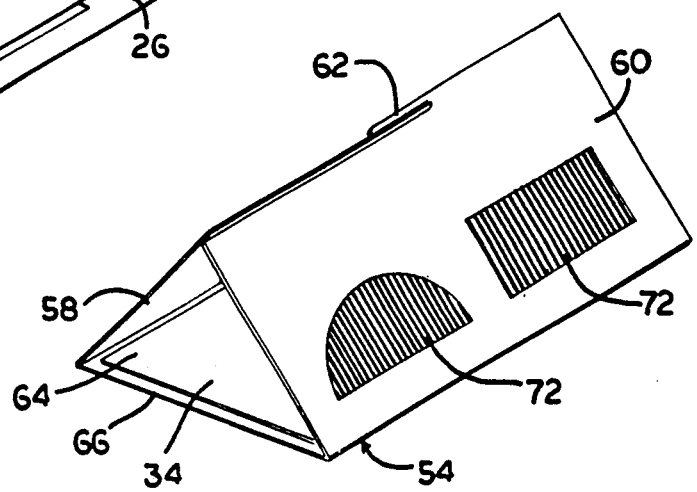
FIG. 5 is a perspective view of a teaching aid representation of a typical monitoring trap according to the present invention.

Assembled training aid 54 is shown in FIG. 5 with side walls 58, 60 folded over simulated trapping surface 64 of wall 66, defining major opening 34. They are held together by interlock 62. Simulated trapping surface 64 is designed for supporting visual representations of insects which may be arranged in predetermined patterns. Surface 64 is adapted for supporting the representations in place temporarily yet removably as desired. For this removably supporting characteristic, surface 64 may be provided, for example with a weak adhesive, Velcro (tm), liquid crystal, or other system as will be discussed later.

On side wall 60, are visual representations 72 of minor openings. They may be printed on the side walls, or punched out for more realistic effect.

Figure 6:
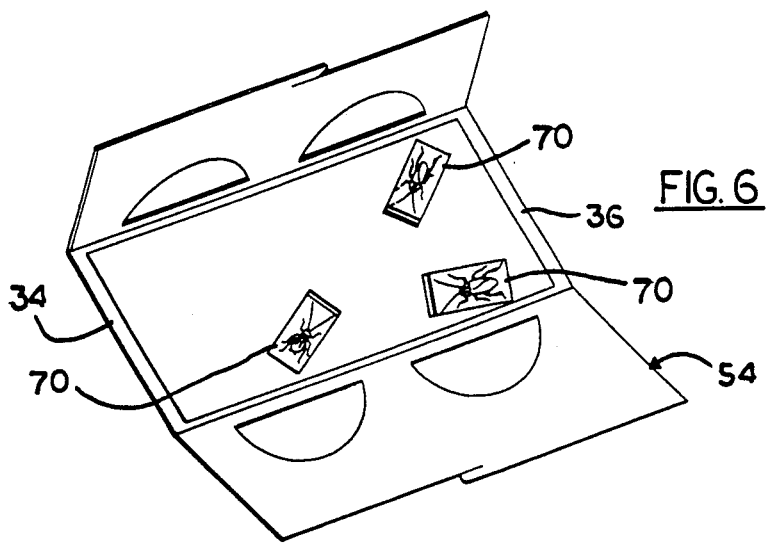
FIG. 6 is a perspective view of a teaching aid according to the invention, open for demonstrating interpretation of an insect pattern.
Figure 7:
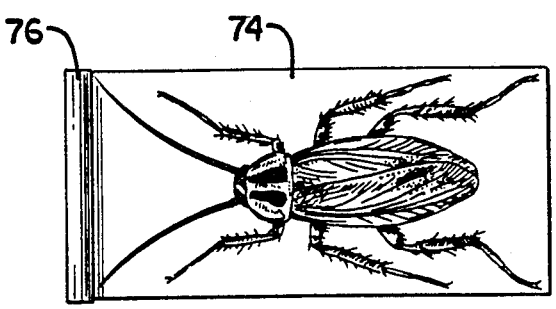

Training aid 54, FIG. 6, is shown with walls 58, 60 folded away from simulated trapping surface 64 for demonstration of insect patterns comprising icons 70 which are each, visual representations of one or more insects. Each icon is printed on a vinyl strip 74 as shown in FIG. 7, with gripping tab 76 at one end for easy attachment to and removal from simulated trapping surface 64 which has a cohesive affinity for vinyl.

Figure 8:
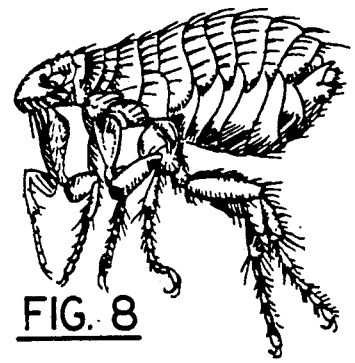

Visual representations of insects may take any form which can be used to indicate orientation, size, age, sex or type of insect, or any combination thereof. FIGS. 7 through 13 show, for example, several forms which may be used. They are supported on the simulated trapping surface by several systems. FIG. 7 icon is removably supported by cohesion as stated earlier. FIG. 8 icon is a three dimensional representation, removably supported by three point contact to a Velcro (tm) surfaced simulated trapping surface. FIGS. 12 and 13 icons are provided on paper with adhesive backing of the type used on "Post-it" (tm 3M Co.) for removable attachment to a paper or plastic simulated trapping surface. FIGS. 9, 10, and 11 are provided on transparent film with suitable adhesive backing, for removable attachment to the simulated trapping surface. They may also be drawn on a non porous simulated trapping surface by erasable felt tip pen or similar erasable marking means. In another embodiment, the icons may be removably attached to the surface by an interlocking surface system such as in Lego (tm) building blocks. An icon may represent a single insect or a pattern of insects.

Training aid 80, shown in FIG. 14, is designed for use with an overhead projector in which light passing through transparent simulated trapping surface 84 is projected on a screen. Icons 70 are cohesively attached transparencies, liquid crystal formations on base 82, or hand drawn by erasable pen on base 82 within visual representation of boundaries 86 of simulated trapping surface 84 and visual representations of major openings 88 onto surface 84. The liquid crystal formations may be preprogrammed on the base and selected by external switching, or may be driven by computer from a program of predetermined formations. Text associated with the various formations may also be provided by the same program.

Referring to FIG. 15, the pattern of icons symbolizing German Cockroaches Blatella germanica (L) in this example in training aid 54 indicate that the insect nest is typically between one and two feet from major opening 34, because First Instar nymphs 92 tend to remain within two feet of a nest, yet only three were "caught". It is a fairly large nest because many roaches were "caught" including older nymphs 94, an adult female 96, and an adult male 98. Going on the assumption that the trap symbolized was placed during the daytime and knowing that German roaches are nocturnal, it can be assumed that the bulk were "caught" leaving the nest. Statistically the roach near major opening 36 is considered an artifact and is disregarded. The nest would be fairly old by several generations, because roaches in all stages of development were "captured". Depending upon the air currents and relative humidity, the pest control technician should expect to find the roach nest one to three feet from the trap in the direction of major opening 36. Considering the predetermined demonstration pattern further, based on reproductive capabilities of German roaches, the technician would look for a fairly large nesting site of probably two or more square inches that has remained undisturbed for sixty days or longer.

The training aid is preferably made from a material which can be collapsed flat or rolled into a tube for portability. Although shown herein to be rectangular, it may be any convenient shape. If it were round for example, a select portion or all of the perimeter of the wall containing the simulated trapping surface may be considered to be a major opening. Ideally, the training aid will have the outward appearance of the type of monitoring trap that is in use.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. A simulated monitoring trap consisting of a first wall having a first side, a second side, and a third side,
   a second wall rotatably attached to said second side,
   a third wall rotatably attached to said third side,
   said second and third walls being rotatable to one another to form with said first wall, a triangular opening at said first side, and
   said first wall being generally planar and having generally planar visual representations of insects removably adhered directly on and parallel with said first wall in an arrangement as they could appear when caught on the sticky trapping surface of a commercial monitoring trap.

* * * * *